US012315195B2

(12) United States Patent
Strandborg et al.

(10) Patent No.: US 12,315,195 B2
(45) Date of Patent: May 27, 2025

(54) USING CLOUD COMPUTING TO IMPROVE ACCURACY OF POSE TRACKING

(71) Applicant: Varjo Technologies Oy, Helsinki (FI)

(72) Inventors: Mikko Strandborg, Hangonkylä (FI); Pekka Väänänen, Helsinki (FI); Petteri Timonen, Helsinki (FI)

(73) Assignee: Varjo Tehcnologies Oy, Helsinki (FI)

( * ) Notice: Subject to any disclaimer, the term of this patent is extended or adjusted under 35 U.S.C. 154(b) by 470 days.

(21) Appl. No.: 17/716,415

(22) Filed: Apr. 8, 2022

(65) Prior Publication Data

US 2023/0326074 A1 Oct. 12, 2023

(51) Int. Cl.
*G06T 7/73* (2017.01)

(52) U.S. Cl.
CPC ..................................... *G06T 7/75* (2017.01)

(58) Field of Classification Search
CPC .......... G06F 3/011; G06F 3/012; G06T 17/00; G06T 19/006; G06T 2207/30244; G06T 15/20; G06T 7/75; G06T 7/80; G06T 7/00; G02B 27/0093; G02B 27/017; G02B 2027/014; G02B 27/0179
See application file for complete search history.

(56) References Cited

U.S. PATENT DOCUMENTS

2016/0232678 A1\* 8/2016 Kurz ...................... G06T 7/344

FOREIGN PATENT DOCUMENTS

CN 109003305 A 12/2018

OTHER PUBLICATIONS

M. Dawood, C. Cappelle, M. E. El Najjar, M. Khalil and D. Pomorski, "Vehicle geo-localization based on IMM-UKF data fusion using a GPS receiver, a video camera and a 3D city model," 2011 IEEE Intelligent Vehicles Symposium (IV), Baden-Baden, Germany, 2011, pp. 510-515, doi: 10.1109/IVS.2011.5940517. (Year: 2011).\*
Cappelle C et al: "Multi-sensors data fusion using Dynamic Bayesian Network for robotised vehicle geo-localisation", 2008 11th International Conference on, IEEE, Piscataway, NJ, USA, Jun. 30, 2008 (Jun. 30, 2008), pp. 1-8, XP031932069, ISBN: 978-3-8007-3092-6.
European Patent Office, European Search Report, Application No. 23160735.9, Mailed Sep. 14, 2023, 10 pages.
(Continued)

*Primary Examiner* — Matthew C Bella
*Assistant Examiner* — Jinsu Hwang
(74) *Attorney, Agent, or Firm* — Ziegler IP Law Group, LLC.

(57) ABSTRACT

A system includes a server and a data repository storing a three-dimensional environment model, where the server is configured to: receive, from a client device a first image of a real-world environment captured by camera along with information indicative of a first measured pose of the client device; utilise the 3D environment model to generate a first reconstructed image from a perspective of a first measured pose; determine a transformation indicative of a difference in the first measured pose and a first actual pose of the client device; use the transformation to calculate the first actual pose; and send information indicative of at least one of: the first actual pose, or the first spatial transformation, to the client device for calculating subsequent actual poses.

8 Claims, 3 Drawing Sheets

(56) References Cited

OTHER PUBLICATIONS

Maya Dawood et al., Vehicle geo-localization based on IMM-UKF data fusion using a GPS receiver, a video camera and a 3D city model, Intelligent Vehicles Symposium (IV), 2011, IEEE, Jun. 5, 2011, pp. 510-515, XP031999027, DOI: 10.1109/IVS.2011.5940517, ISBN: 978-1-4577-0890-9.

* cited by examiner

USING CLOUD COMPUTING TO IMPROVE ACCURACY OF POSE TRACKING

TECHNICAL FIELD

The present disclosure relates to systems for improving accuracy of pose tracking. The present disclosure also relates to methods for improving accuracy of pose tracking.

BACKGROUND

In recent times, there has been an ever-increasing demand for pose-consistent image generation. Such a demand may, for example, be quite high and critical in case of evolving technologies such as immersive extended-reality (XR) technologies, which are being employed in various fields such as entertainment, real estate, training, medical imaging operations, simulators, navigation, and the like. Such immersive XR technologies create XR environments for presentation to users of XR devices (such as an XR headsets, pairs of XR glasses, or similar).

However, existing equipment and techniques employing pose-tracking means have several problems associated therewith. Firstly, the existing equipment and techniques are inefficient in terms of accurately tracking a pose of an XR device. This is because existing equipment and techniques completely rely on the pose-tracking means which typically perform pose tracking by identifying multiple tracking features (or tracking points) represented in images that are captured by camera(s) of the XR device, and then deducing changes in poses of the XR device, based on movements of said tracking features in the images. Such a manner of pose tracking is error-prone and unreliable, especially when the pose of the XR device (namely, a pose of a user's head) is constantly changing. In addition to this, the pose-tracking means often incorrectly measures or is not able to measure poses due to dynamic content that confuses the existing techniques, a rapid movement of the user causing motion-blur and discontinuity in pose-tracking, and/or a sudden change in lighting conditions that makes image features to appear different, and the like. Resultantly, generation of pose-consistent images is compromised in terms of accuracy which may, for example, lead to a sub-optimal (i.e., a lack of realism), non-immersive viewing experience for the user viewing such images. Secondly, some existing techniques employ a locally-stored 3D reconstruction model as part of pose tracking. However, (low power) XR devices have limited computational and storage resources, which makes them unsuitable for generating, storing or maintaining a 3D reconstruction model to be utilized for pose tracking.

Therefore, in light of the foregoing discussion, there exists a need to overcome the aforementioned drawbacks associated with existing equipment and techniques employing pose-tracking means.

SUMMARY

The present disclosure seeks to provide a system for improving accuracy of pose tracking. The present disclosure also seeks to provide a method for improving accuracy of pose tracking. An aim of the present disclosure is to provide a solution that overcomes at least partially the problems encountered in prior art.

In a first aspect, an embodiment of the present disclosure provides a system comprising a server and a data repository communicably coupled to the server, the data repository storing a three-dimensional environment model of a real-world environment, wherein the server is configured to:
  receive, from a client device, at least one first image of the real-world environment captured by at least one camera of the client device, along with information indicative of a first measured pose of the client device as measured by pose-tracking means of the client device while the at least one first image is being captured;
  utilise the three-dimensional environment model of the real-world environment to generate at least one first reconstructed image from a perspective of the first measured pose of the client device;
  determine a first spatial transformation that aligns a plurality of features extracted from the at least one first image with a plurality of features extracted from the at least one first reconstructed image, wherein the first spatial transformation is indicative of a difference in the first measured pose of the client device and a first actual pose of the client device from which the at least one first image is captured;
  calculate the first actual pose of the client device, based on the first measured pose and the first spatial transformation; and
  send information indicative of at least one of: the first actual pose of the client device, the first spatial transformation, to the client device for enabling the client device to calculate subsequent actual poses of the client device.

In a second aspect, an embodiment of the present disclosure provides a method comprising:
  receiving, at a server from a client device, at least one first image of a real-world environment captured by at least one camera of the client device, along with information indicative of a first measured pose of the client device as measured by pose-tracking means of the client device while the at least one first image is being captured;
  utilising a three-dimensional environment model of the real-world environment, at the server, for generating at least one first reconstructed image from a perspective of the first measured pose of the client device;
  determining, at the server, a first spatial transformation that aligns a plurality of features extracted from the at least one first image with a plurality of features extracted from the at least one first reconstructed image, wherein the first spatial transformation is indicative of a difference in the first measured pose of the client device and a first actual pose of the client device from which the at least one first image is captured;
  calculating, at the server, the first actual pose of the client device, based on the first measured pose and the first spatial transformation; and
  sending information indicative of at least one of: the first actual pose of the client device, the first spatial transformation, from the server to the client device for enabling the client device to calculate subsequent actual poses of the client device.

Embodiments of the present disclosure substantially eliminate or at least partially address the aforementioned problems in the prior art, and enable accurate, reliable, high quality pose tracking of client device(s) by way of using cloud computing, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
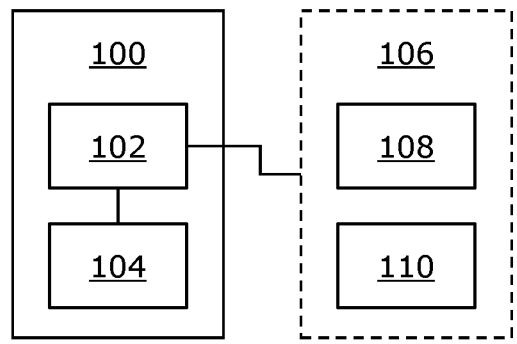
FIGS. 1 and 2 illustrate block diagrams of architectures of a system for improving accuracy of pose tracking, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising a server and a data repository communicably coupled to the server, the data repository storing a three-dimensional environment model of a real-world environment, wherein the server is configured to:
  receive, from a client device, at least one first image of the real-world environment captured by at least one camera of the client device, along with information indicative of a first measured pose of the client device as measured by pose-tracking means of the client device while the at least one first image is being captured;
  utilise the three-dimensional environment model of the real-world environment to generate at least one first reconstructed image from a perspective of the first measured pose of the client device;
  determine a first spatial transformation that aligns a plurality of features extracted from the at least one first image with a plurality of features extracted from the at least one first reconstructed image, wherein the first spatial transformation is indicative of a difference in the first measured pose of the client device and a first actual pose of the client device from which the at least one first image is captured;
  calculate the first actual pose of the client device, based on the first measured pose and the first spatial transformation; and
  send information indicative of at least one of: the first actual pose of the client device, the first spatial transformation, to the client device for enabling the client device to calculate subsequent actual poses of the client device.

In a second aspect, an embodiment of the present disclosure provides a method comprising:
  receiving, at a server from a client device, at least one first image of a real-world environment captured by at least one camera of the client device, along with information indicative of a first measured pose of the client device as measured by pose-tracking means of the client device while the at least one first image is being captured;
  utilising a three-dimensional environment model of the real-world environment, at the server, for generating at least one first reconstructed image from a perspective of the first measured pose of the client device;
  determining, at the server, a first spatial transformation that aligns a plurality of features extracted from the at least one first image with a plurality of features extracted from the at least one first reconstructed image, wherein the first spatial transformation is indicative of a difference in the first measured pose of the client device and a first actual pose of the client device from which the at least one first image is captured;
  calculating, at the server, the first actual pose of the client device, based on the first measured pose and the first spatial transformation; and
  sending information indicative of at least one of: the first actual pose of the client device, the first spatial transformation, from the server to the client device for enabling the client device to calculate subsequent actual poses of the client device.

The present disclosure provides the aforementioned system and the aforementioned method for improving accuracy of pose tracking. Herein, the client device sends the first measured pose of the client device (as measured by the pose-tracking means) and a corresponding first image to the server, and the server rectifies (namely, fine-tunes) the first measured pose by calculating the first actual pose of the client device using the 3D environment model. In this manner, (low power) client devices having limited computational and storage resources need not generate/store/maintain the 3D environment model to be utilized for pose tracking. Upon said rectification, the client device beneficially utilizes the first actual pose and/or the first spatial transformation to calculate its subsequent actual poses in an accurate and precise manner.

Advantageously, this enables the client device in improving pose-tracking quality (for example, in terms of accuracy and reliability) without requiring significant additional computational resources. Communicating and utilizing such information at the client device requires minimal power and bandwidth requirements. Resultantly, accurate pose-consistent images (for example, XR images) can be generated and displayed to a user of the client device. This may, for example, lead to optimal (i.e., realistic), immersive viewing experience for the user. Moreover, the system enables in accurate pose tracking of the client device even in scenarios when the pose-tracking means incorrectly measures or is not able to measure the pose due to dynamic content, rapid movements of the user, a sudden change in lighting conditions, and the like. The system and the method are simple, robust, fast, reliable and can be implemented with ease.

Furthermore, correcting the measured poses to obtain the actual poses enables the system and method to utilise the captured images to update the 3D environment model stored at the data repository. Moreover, the aforementioned system and the aforementioned method can be implemented to collaborate images and pose-tracking data from multiple devices to generate and update the 3D environment model. Poses of all the devices can optionally be tracked by employing a same coordinate space for all the devices. Such collaboration further improves tracking quality and prevents drift in pose.

Throughout the present disclosure, the term "server" refers to hardware, software, firmware or a combination of these that provides functionality by way of resources, data, services or programs to one or more client devices. Notably, the server generates the at least one first reconstructed image and determines the first spatial transformation for calculating the first actual pose of the client device, so as to send the first actual pose and/or the first spatial transformation to the client device in real time or near-real time (without any latency/delay). In some implementations, the server is implemented as a remote server. In such implementations, the server is separately located from the client device. As an example, the server is implemented as a cloud server that provides a cloud computing service. In other implementations, the server is implemented as a processor of a computing device. Examples of the computing device include, but are not limited to, a laptop, a desktop computer, a tablet, a phablet, a personal digital assistant, a workstation, a console. The server could be communicably coupled to the client device wirelessly and/or in a wired manner.

Throughout the present disclosure, the term "data repository" refers to hardware, software, firmware, or a combination of these for storing at least the three-dimensional (3D) environment model of the real-world environment in an organized (namely, structured) manner, thereby, allowing for easy storage, access (namely, retrieval), updating of the 3D environment model. The data repository may be implemented as a memory of the server, a cloud-based database, or similar. It will be appreciated that the data repository may store 3D environment models of different real-world environments. This beneficially allows the server to be able to serve different client devices that are physically present at the different real-world environments.

The client device, in operation, sends the at least one first image and the first measured pose of the client device to the server, and subsequently receives the first actual pose of the client device and/or the first spatial transformation from the server for calculating its subsequent actual poses. In a client-server relationship, the client device acts as a service or resource requester, whereas the server acts as a service or resource provider.

Optionally, the client device is implemented as a display apparatus. The "display apparatus" refers to a specialized equipment that is configured to present an extended-reality (XR) environment to a user when the display apparatus in operation is worn by the user on his/her head. In such an instance, the display apparatus acts as a specialized device (for example, such as an XR headset, a pair of XR glasses, and the like) that is operable to present a visual scene of the XR environment to the user. Commonly, the "display apparatus" is referred to as "head-mounted display (HMD) device". The term "extended-reality" encompasses virtual reality (VR), augmented reality (AR), mixed reality (MR), and the like. The client device may be a low-power device (such as an XR device).

Throughout the present disclosure, the term "camera" refers to an equipment that is operable to detect and process light signals received from the real-world environment, so as to capture image(s) of the real-world environment. Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, a given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given camera may be implemented as the stereo camera.

Throughout the present disclosure, the term "image" refers to a visual representation of the real-world environment, which encompasses not only colour information represented in the image, but also other attributes associated with the image (for example, such as depth information, transparency information, luminance information, brightness information, and the like). Optionally, a given image is one of: a visible-light image, a depth image, a phase image. The depth image may, for example, be in a form of a depth map.

Throughout the present disclosure, the term "pose-tracking means" refers to a specialized equipment that is employed to detect and/or follow a pose of the client device. Herein, the term "pose" encompasses both position and orientation. Pursuant to embodiments of the present disclosure, the pose-tracking means is implemented as a true six Degrees of Freedom (6DoF) tracking system that tracks translational movements (namely, surge, heave and sway movements) and rotational movements (namely, roll, pitch and yaw movements) of the client device within a 3D space of the real-world environment.

Optionally, (a processor of) the client device is configured to process pose-tracking data, collected by the pose-tracking means, to determine a given measured pose of the client device. In this regard, the pose-tracking means may employ an inside-out tracking technique, an outside-in tracking technique, or a combination of both the aforesaid techniques, for collecting the pose-tracking data. Such techniques are well-known in the art. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader.

Optionally, (the processor of) the client device is configured to employ at least one data processing algorithm to process the pose-tracking data. The pose-tracking data may be in form of images, IMU/TIMU values, motion sensor data values, magnetic field strength values, or similar. Correspondingly, requisite data processing algorithm(s) is/are employed to process the pose-tracking data, to determine the given measured pose of the given device. Examples of such a data processing algorithm include a feature detection algorithm, an environment mapping algorithm, and a pose data extrapolation algorithm.

Optionally, a given pose of the client device is measured by the pose-tracking means in a global coordinate space. Herein, the term "global coordinate space" refers to a 3D space of the real-world environment that is represented by a global coordinate system. The global coordinate system defines a position within the 3D space of the real-world environment. Optionally, the global coordinate system has a predefined origin and three mutually perpendicular coordinate axes. The mutually perpendicular three coordinate axes could be, for example, X, Y, and Z axes. Optionally, in this regard, the position in the global coordinate system is expressed as (x, y, z) position coordinates along the X, Y and Z axes, respectively. It will be appreciated that when a given image of the real-world environment is captured, the pose-tracking data corresponding to a time of capturing the given image is processed to determine a given measured pose of the client device.

Throughout the present disclosure, the term "three-dimensional environment model" refers to a data structure that comprises comprehensive information pertaining to a 3D space of the real-world environment whereat the client device is present. Such a comprehensive information is indicative of at least one of: a plurality of features of objects present in the real-world environment, shapes and sizes of the objects or their portions, poses of the objects or their portions, materials of the objects or their portions, colours of the objects or their portions, light sources in the real-world environment, lighting conditions within the first real-world environment. It will be appreciated that the plurality of features include, but are not limited to, edges, corners, blobs, ridges, high-frequency features, and low-frequency features. The object could be a living object (for example, such as a human, a pet, a plant, and the like) or a non-living object (for example, such as an optical barrier, a window, a toy, a poster, a lamp, and the like).

Optionally, the 3D environment model is in a form of at least one of: a 3D polygonal mesh, a 3D point cloud, a 3D surface cloud, a 3D surflet cloud, a voxel-based model, a mathematical 3D surface model, a parametric model, a 3D grid, a 3D hierarchical grid, a bounding volume hierarchy. The 3D polygonal mesh could be a 3D triangular mesh, a 3D quadrilateral mesh, and the like. The mathematical 3D surface model may be based on a plane, a sphere, a cylinder, a box, or similar. For example, the mathematical 3D surface model may be a non-uniform rational basis spline (NURBS) model.

Notably, a given reconstructed image is generated according to a viewpoint and/or a viewing direction of the client device as indicated by the given measured pose. The given reconstructed image is a visual representation of the real-world environment (whereat the client device is present) from a perspective of the given measured pose of the client device, wherein said visual representation is generated using the 3D environment model. The given reconstructed image could be a reconstructed visible-light image or a reconstructed depth image.

Optionally, when utilising the 3D environment model to generate the given reconstructed image, the server is configured to employ at least one data processing algorithm. Optionally, in this regard, the at least one data processing algorithm enables in transforming a 3D point in the 3D environment model to a 2D point in the given reconstructed image, from the perspective of the given measured pose of the client device. Optionally, the at least one data processing algorithm is at least one of: an image synthesis algorithm (such as an RGB-D image synthesis algorithm), a view synthesis algorithm, a rendering algorithm. Such data processing algorithms are well-known in the art. In an example, when the 3D environment model is in the form of a 3D polygonal mesh (for example, such as a 3D triangular mesh), the image synthesis algorithm may be a triangle rasterization algorithm. In another example, when the 3D environment model is in the form of a voxel-based model (such as a Truncated Signed Distance Field (TSDF) model), the image synthesis algorithm may be a ray-marching algorithm. In yet another example, when the 3D environment model is in the form of a 3D point cloud, the rendering algorithm may be a point cloud rendering algorithm, a point cloud splatting algorithm, an elliptical weighted-average surface splatting algorithm, or similar.

Optionally, the server is configured to:
  receive, from at least one static device, a plurality of images of the real-world environment captured by at least one camera of the at least one static device, wherein the at least one static device is located at a fixed position in the real-world environment;
  process the plurality of images, based on the fixed position of the at least one static device, to generate the three-dimensional environment model of the real-world environment; and
  store the three-dimensional environment model at the data repository.

Herein, the term "static device" refers to a stationary device that is present in the real-world environment, and is optionally employed to generate the 3D environment model of the real-world environment. Optionally, the at least one static device is a teleport device. The term "teleport device" refers to a specialized equipment that is capable of facilitating virtual teleportation. It will be appreciated that the plurality of images of the real-world environment are captured with respect to the fixed position of the at least one static device in the real-world environment.

Optionally, when processing the plurality of images to generate the 3D environment model, the server is configured to employ at least one other data processing algorithm. Optionally, in this regard, the at least one other data processing algorithm is at least one of: an image stitching algorithm, an image merging algorithm, an interpolation algorithm, a 3D modelling algorithm, a photogrammetry algorithm, an image layering algorithm, an image blending algorithm. Such data processing algorithms are well-known in the art. Optionally, processing the plurality of images based on the fixed position of the at least one static device enables the server to accurately determine the objects or their portions that are visible in the plurality of images from a fixed perspective of the at least one camera of the at least one static device. Such a determination is well-utilized by the server when generating the comprehensive information constituting the 3D environment model. Beneficially, the 3D environment model generated in this manner would be very accurate (for example, in terms of generating the given reconstructed image using the 3D environment model), realistic, and information-rich.

Optionally, the 3D environment model is generated in the global coordinate space. Upon generating the 3D environment model, the server is configured to send the (generated) 3D environment model to the data repository for storage thereat. It will be appreciated that the 3D environment model is generated prior to a given session of using the client device. In such a case, the 3D environment model is already and readily available to the server for correcting (namely, rectifying) a given measured pose of the client device. This subsequently improves pose-tracking quality by reducing an amount of pose drift, and by eliminating a need for loop closures. Moreover, minimal pose error would be accumulated throughout the given session of using the client device.

Optionally, the server is configured to:
receive, from the at least one static device, the plurality of images of the real-world environment along with information indicative of corresponding orientations of the at least one camera from which the plurality of images are being captured, wherein an orientation of the at least one static device or the at least one camera is adjustable using a motorized actuator; and
process the plurality of images, based on the fixed position and the corresponding orientations of the at least one camera, to generate the three-dimensional environment model of the real-world environment.

When the plurality of images are captured from different orientations of the at least one camera of the at least one static device, the plurality of images are visual representations of the real-world environment from different perspectives of the at least one camera. Since the at least one static device is located at the fixed position in the real-world environment, a given perspective of the at least one camera changes when only an orientation of the at least one camera or the at least one static device changes. Such a change in the orientation is accurately controllable by the motorized actuator.

The term "motorized actuator" refers to an equipment that is employed to tilt the at least one static device or the at least one camera of the at least one static device with which it is associated. Such equipment may, for example, include electrical components, mechanical components, magnetic components, polymeric components and so forth. Such an actuator is driven by an actuation signal. Such an actuation signal could be a piezoelectric force, an electromagnetic force, a mechanical torque, an electric current, a hydraulic pressure, a pneumatic pressure or similar. In an example, the orientation of the at least one static device or the at least one camera is adjustable from 0 degree to 360 degrees using the motorized actuator.

Optionally, processing the plurality of images based on the fixed position and the corresponding orientations of the at least one camera of the at least one static device enables the server to accurately determine the objects or their portions that are visible in the plurality of images from various orientations of the at least one camera with respect to the fixed position. Such a determination is well-utilized by the server when generating the comprehensive information constituting the 3D environment model. Beneficially, the 3D environment model generated in this manner would be highly accurate, realistic, and information-rich.

Alternatively or additionally, optionally, the 3D environment model of the real-world environment is generated (in the global coordinate space), by processing a plurality of images captured using cameras of multiple client devices. In such a case, the multiple client devices would have a common 3D environment model, and each of the multiple client devices beneficially uses a same (global) coordinate space (which can be useful, for example, such as in collaboration of users using the multiple client devices). Beneficially, in this regard, conversions from one coordinate space to another coordinate space is not required. Moreover, this subsequently improves pose-tracking quality by reducing an amount of pose drift, and by eliminating a need for loop closures.

Optionally, the server is configured to employ at least one image processing algorithm for extracting the plurality of features from a given image and/or a given reconstructed image. Examples of the at least one image processing algorithm include, but are not limited to, an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a feature descriptor algorithm (for example, such as Binary Robust Independent Elementary Features (BRIEF), Gradient Location and Orientation Histogram (GLOH), Histogram of Oriented Gradients (HOG), and the like), a feature detector algorithm (for example, such as the SIFT, the SURF, Oriented FAST and rotated BRIEF (ORB), and the like).

Since the first measured pose of the client device (that corresponds to the at least one first reconstructed image) and the first actual pose of the client device (that corresponds to the at least one first image) are slightly different, there would be offsets between positions/orientations of features extracted from the at least one first reconstructed image and positions/orientations of corresponding features extracted from the at least one first image. In this regard, the first spatial transformation that aligns the aforesaid features in the at least one first reconstructed image and the at least one first image is determined. The first spatial transformation may, for example, include at least one of: scaling, rotation, translation, skewing. Thus, the server can accurately determine an offset between the first measured pose of the client device and the first actual pose of the client device, based on the first spatial transformation. In an example, the server may employ brute-force searching of nearby poses of the client device for aligning the aforesaid features, wherein said poses may be determined based on additional pose-tracking information, for example, such as a pose probability cloud provided by the pose-tracking means.

It will be appreciated that when the given image and the given reconstructed image are depth images (or depth maps) in form of point clouds, the server is optionally configured to employ at least one point-cloud registration technique for determining a given spatial transformation that aligns respective point clouds. Beneficially, this minimizes point-plane error while determining the given spatial transformation, and also provides robustness against changing lighting conditions in the real-world environment. Optionally, the at least one point-cloud registration technique is at least one of: an iterative closest point (ICP) technique, a dense hierarchical ICP technique, a trimmed iterative closest point (TrICP) technique, a point-to-plane ICP technique, a generalized ICP technique, a normal iterative closest point (NICP)

technique, a robust point matching (RPM) technique, a kernel correlation (KC) technique, a coherent point drift (CPD) technique, a sorting the correspondence space (SCS) technique, a deep learning-based point-cloud registration technique, a lie-algebraic averaging technique.

Since the first measured pose of the client device (as measured by the pose-tracking means) and the first spatial transformation are already and accurately known to the server, the server can easily calculate the first actual pose of the client device. In this manner, the server beneficially rectifies (namely, fine-tunes) the first measured pose of the client device with high accuracy and precision. Optionally, the server is configured to employ at least one mathematical technique for calculating the first actual pose of the client device. Such a mathematical technique may be based on coordinate geometry.

In a first example, the first measured pose of the client device may be (1, 2, 3), and the first spatial transformation may be (0, −0.5, +0.5) along X, Y, and Z axes, respectively. In such a case, the first actual pose of the client device may be calculated to be (1, 1.5, 3.5).

Notably, upon rectifying the first measured pose of the client device, the server sends the information indicative of the first actual pose of the client device and/or the first spatial transformation, to the client device. Thus, the client device beneficially utilizes such information to calculate its subsequent actual poses in an accurate manner. Since the aforesaid information is sent to the client device as feedback for calculating subsequent poses of the client device, this enables the client device in improving pose-tracking quality without requiring significant additional computational resources. Communicating and utilizing such information at the client device requires minimal power and bandwidth requirements. In an example, the information may be considered either as a simple straightforward bias adjustment for calculating subsequent actual poses of the client device, or as an additional input for a part of a camera sensor-fusion system that the pose-tracking means typically already implements.

In an embodiment, the system further comprises the client device, wherein the client device is configured to:
  receive, from the server, the information indicative of the first actual pose of the client device;
  capture at least one second image of the real-world environment using the at least one camera, whilst measuring a second measured pose of the client device using the pose-tracking means;
  determine a change in pose between the first measured pose and the second measured pose; and
  calculate a second actual pose of the client device from which the at least one second image is captured, based on the first actual pose and the change in pose.

It will be appreciated that the information indicative of the first actual pose is received by the client device in real time or near-real time (without any latency/delay). Since the first measured pose and the second measured pose are readily available to the client device, the change in pose can be accurately determined by the client device using 2D-2D feature correspondences between the at least one first image and the at least one second image as described below.

Optionally, when determining the change in pose, the client device is configured to:
  determine a plurality of common features that are present in the at least one first image and the at least one second image; and
  determine another spatial transformation that aligns the plurality of common features as extracted from the at least one first image with the plurality of common features as extracted from the at least one second image, wherein the another spatial transformation is indicative of the change in pose between the first measured pose and the second measured pose.

Optionally, (the processor of) the client device is configured to employ the at least one image processing algorithm for extracting a plurality of features from the at least one first image and/or a plurality of features from the at least one second image. Optionally, in this regard, (the processor of) the client device is configured to compare the features extracted from the at least one first image with the features extracted from the at least one second image, and matching features that are present in both the at least one first image and the at least one second image are determined (namely, identified) as the plurality of common features.

It will be appreciated that during a time period (for example, such as 100 milliseconds) between capturing the at least one first image and capturing the at least one second image, a pose of the client device may have changed in a manner that some features that are present in the at least one first image are also present in the at least one second image. Moreover, there would be offsets between positions/orientations of such common features in the at least one first image and the at least one second image. In this regard, the another spatial transformation that aligns the aforesaid common features is determined. Thus, the client device can accurately determine an offset between the first measured pose and the second measured pose, based on the another spatial transformation. In an example, a number of common features in the at least one first image and the at least one second image may be equal to or greater than five. For robustness and efficient implementation of the system, the number of common features may be five.

The client device beneficially utilizes the first actual pose (received from the server) and the change in pose for accurately calculating its subsequent actual pose, such as the second actual pose. Optionally, (the processor of) the client device is configured to employ at least one mathematical technique for calculating the second actual pose. Such a mathematical technique may be based on coordinate geometry.

Referring to and continuing from the first example, the second measured pose of the client device may be (−1, 5, 2). Thus, the change in pose between the first measured pose and the second measured pose is (−2, 3, −1) along the X, Y, and Z axes, respectively. In such a case, the second actual pose of the client device can be calculated to be (−1, 4.5, 2.5).

In an alternate or an additional embodiment, the system further comprises the client device, wherein the client device is configured to:
  receive, from the server, the information indicative of the first spatial transformation;
  capture at least one second image of the real-world environment using the at least one camera, whilst measuring a second measured pose of the client device using the pose-tracking means; and
  calculate a second actual pose of the client device from which the at least one second image is captured, based on the second measured pose and the first spatial transformation.

The aforementioned embodiment covers a case where the server sends the first spatial transformation (with or without the first actual pose of the client device) to the client device. It will be appreciated that the information indicative of the first spatial transformation is received by the client device in real time or near-real time (without any latency/delay). Since the second measured pose and the first spatial transformation are readily available to the client device, the client device can accurately calculate the second actual pose by utilizing the at least one mathematical technique.

Referring to and continuing from the first example, when the second measured pose is (−1, 5, 2) and the first spatial transformation is (0, −0.5, +0.5), the second actual pose of the client device can be calculated to be (−1, 4.5, 2.5). It will be appreciated that the second actual pose that is calculated based on the second measured pose and the first spatial transformation is same as the second actual pose that has been calculated based on the first actual pose and the change in pose.

It will be appreciated that when the at least one second image of the real-world environment is captured, the pose-tracking data corresponding to a time of capturing the at least one second image is processed to determine the second measured pose of the client device. It will also be appreciated that the client device is optionally configured to send the (calculated) second actual pose along with the at least one second image to the server. In such a case, the server may perform the aforesaid operations (of the first aspect) to further refine the (calculated) second actual pose of the client device. Such a manner of iteratively performing the aforesaid operations for subsequently calculating actual poses of the client device facilitates in determining poses of the client device with a high accuracy.

In another embodiment, the server is configured to:
  receive, from the client device, information indicative of two-dimensional positions of the plurality of features extracted from the at least one first image;
  utilize the three-dimensional environment model of the real-world environment to determine actual three-dimensional positions of the plurality of features in the real-world environment, based on the first actual pose and the two-dimensional positions of the plurality of features; and
  send information indicative of the actual three-dimensional positions of the plurality of features in the real-world environment, to the client device for enabling the client device to calculate the subsequent actual poses of the client device.

In this regard, since the client device extracts the plurality of features from the at least one first image, the 2D positions (namely, 2D coordinates) of the plurality of features are readily and accurately known to the client device, and are sent to the server in real time or near-real time. It will be appreciated that a 2D position of a given feature in the at least one first image corresponds to an actual 3D position (namely, 3D coordinates) of the given feature in the real-world environment. In this regard, the server is configured to utilize the comprehensive information constituting the 3D environment model for ascertaining the actual 3D position of the given feature in the real-world environment, from a perspective of the first actual pose of the client device. Such an actual 3D position is optionally determined in the global coordinate space, and is sent to the client device. Optionally, the server is configured to employ at least one data processing technique for determining the actual 3D position of the given feature in the real-world environment. Such a data processing technique is at least one of: a triangulation technique, a ray tracing technique, an inverse projection transformation technique. Such data processing techniques are well-known in the art. As an example, the inverse projection transformation technique utilizes an inverse projection matrix to determine the actual 3D position of the given feature from the perspective of the first actual pose of the client device.

In another example, the server could utilize the 3D environment model from various perspectives of poses of the client device that slightly deviate from the first measured pose of the client device to generate corresponding images, and select a pose (from amongst these poses) that corresponds to a generated image that matches the at least one first image most closely. The server then utilizes the selected pose to determine the actual 3D position of the given feature in the real-world environment that most closely corresponds to the 2D position of the given feature in the at least one first image. Beneficially, in such a case, the actual 3D positions of the plurality of features are accurately determined. It will be appreciated that there could be several ways/approaches to optimize the aforesaid implementation. For example, the 3D environment model could be utilized only for region(s) surrounding the plurality of features in the at least one first image, instead of an entirety of the at least one first image, for determining the 2D position of the given feature that most closely corresponds to the actual 3D position.

Upon generating the actual 3D positions of the plurality of features, the server sends said actual 3D positions to the client device. The client device beneficially utilizes such information to calculate its subsequent actual poses in an accurate manner.

Optionally, in the another embodiment, the system further comprises the client device, wherein the client device is configured to:
  receive, from the server, the information indicative of the actual three-dimensional positions of the plurality of features in the real-world environment;
  capture at least one second image of the real-world environment using the at least one camera;
  identify two-dimensional positions of the plurality of features in the at least one second image; and
  calculate a second actual pose of the client device from which the at least one second image is captured, based on the actual three-dimensional positions of the plurality of features in the real-world environment and the two-dimensional positions of the plurality of features in the at least one second image.

It will be appreciated that the information indicative of the actual 3D positions of the plurality of features is received by the client device in real time or near-real time (without any latency/delay). Moreover, in this implementation, the client only captures the at least one second image using the at least one camera, and need not employ the pose-tracking means to measure the second measured pose of the client device whilst capturing the at least one second image. Thus, this implementation is beneficial in scenarios where the pose-tracking means incorrectly measures or is not able to measure poses of the client device, for example, such as due to due to dynamic content, rapid movements of the user, a sudden change in lighting conditions, and the like.

As the client device extracts the plurality of features from the at least one second image, the 2D positions of the plurality of features are readily known and accurately known to the client device. Since the plurality of features for which 3D actual positions are known, are represented in the at least one first image, while the plurality of features for which 2D positions are known are represented in the at least one second image, the client device is configured to: determine common features that are present in both the at least one first image and the at least one second image; and utilize actual 3D positions of common features in the real-world environment and 2D positions of common features in the at least one second image, for calculating the second actual pose of the client device. Optionally, when calculating the second actual pose of the client device, the client device is configured to employ at least one data processing technique. Such a data processing technique is at least one of: a triangulation technique, a perspective-n-point (PnP) technique. As an example, the PnP technique may be a P3P technique. Such data processing techniques are well-known in the art.

It will be appreciated that a given measured pose of the client device (as measured by the pose-tracking means) and/or the (calculated) second actual pose of the client device could be further fine-tuned (namely, refined) by employing a Kalman filter (or a similar filter) to ensure robustness.

The present disclosure also relates to the method as described above. Various embodiments and variants disclosed above, with respect to the aforementioned first aspect, apply mutatis mutandis to the method.

Optionally, the method further comprises:
receiving, at the client device from the server, the information indicative of the first actual pose of the client device;
capturing at least one second image of the real-world environment using the at least one camera, whilst measuring a second measured pose of the client device using the pose-tracking means;
determining, at the client device, a change in pose between the first measured pose and the second measured pose; and
calculating, at the client device, a second actual pose of the client device from which the at least one second image is captured, based on the first actual pose and the change in pose.

Optionally, in the method, the step of determining the change in pose comprises:
determining a plurality of common features that are present in the at least one first image and the at least one second image; and
determining another spatial transformation that aligns the plurality of common features as extracted from the at least one first image with the plurality of common features as extracted from the at least one second image, wherein another spatial transformation is indicative of the change in pose between the first measured pose and the second measured pose.

Optionally, the method further comprises:
receiving, at the client device from the server, the information indicative of the first spatial transformation;
capturing at least one second image of the real-world environment using the at least one camera, whilst measuring a second measured pose of the client device using the pose-tracking means; and
calculating, at the client device, a second actual pose of the client device from which the at least one second image is captured, based on the second measured pose and the first spatial transformation.

Optionally, the method further comprises:
receiving, at the server from the client device, information indicative of two-dimensional positions of the plurality of features extracted from the at least one first image;
utilizing the three-dimensional environment model of the real-world environment, at the server, for determining actual three-dimensional positions of the plurality of features in the real-world environment, based on the first actual pose and the two-dimensional positions of the plurality of features; and
sending information indicative of the actual three-dimensional positions of the plurality of features in the real-world environment, from the server to the client device for enabling the client device to calculate the subsequent actual poses of the client device.

Optionally, the method further comprises:
receiving, at the client device from the server, the information indicative of the actual three-dimensional positions of the plurality of features in the real-world environment;
capturing at least one second image of the real-world environment using the at least one camera;
identifying, at the client device, two-dimensional positions of the plurality of features in the at least one second image; and
calculating, at the client device, a second actual pose of the client device from which the at least one second image is captured, based on the actual three-dimensional positions of the plurality of features in the real-world environment and the two-dimensional positions of the plurality of features in the at least one second image.

Optionally, the method further comprises:
receiving, at the server from at least one static device, a plurality of images of the real-world environment captured by at least one camera of the at least one static device, wherein the at least one static device is located at a fixed position in the real-world environment;
processing the plurality of images, at the server, based on the fixed position of the at least one static device, to generate the three-dimensional environment model of the real-world environment; and
storing the three-dimensional environment model at a data repository.

Optionally, the method further comprises:
receiving, at the server from the at least one static device, the plurality of images of the real-world environment along with information indicative of corresponding orientations of the at least one camera from which the plurality of images are being captured, wherein an orientation of the at least one static device or the at least one camera is adjustable using a motorized actuator; and
processing the plurality of images, at the server, based on the fixed position and the corresponding orientations of the at least one camera, to generate the three-dimensional environment model of the real-world environment.

DETAILED DESCRIPTION OF THE DRAWINGS

Referring to FIG. 1, illustrated is a block diagram of architecture of a system 100 for improving accuracy of pose tracking, in accordance with an embodiment of the present disclosure. The system 100 comprises a server 102 and a data repository 104 communicably coupled to the server 102. Furthermore, the server 102 is communicably coupled to a client device 106. The client device 106 comprises at least one camera (depicted as a camera 108) and pose-tracking means 110.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of servers and data repositories. The person skilled in the art will recognize many variations, alternatives, and modifications of embodiments of the present disclosure.

Figure 2:
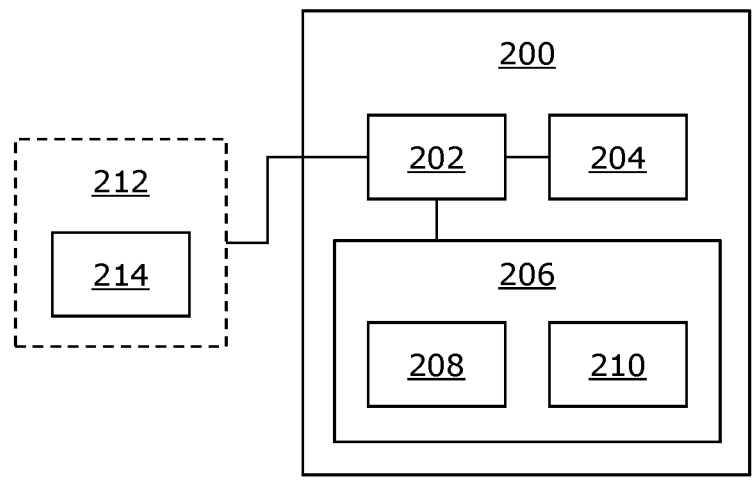

Referring to FIG. 2, illustrated is a block diagram of architecture of a system 200 for improving accuracy of pose tracking, in accordance with another embodiment of the present disclosure. The system 200 comprises a server 202, a data repository 204 communicably coupled to the server 202, and a client device 206 communicably coupled to the server 202. The client device 206 comprises at least one camera (depicted as a camera 208) and pose-tracking means 210. Furthermore, the server 202 is communicably coupled to at least one static device (depicted as a static device 212). The static device 212 comprises at least one camera (depicted as a camera 214).

It may be understood by a person skilled in the art that the FIG. 2 includes a simplified architecture of the system 200 for sake of clarity, which should not unduly limit the scope of the claims herein. It is to be understood that the specific implementation of the system 200 is provided as an example and is not to be construed as limiting it to specific numbers or types of servers, data repositories and client devices, and to specific numbers or types of cameras and pose-tracking means in the client devices. The person skilled in the art will recognize many variations, alternatives, and modifications of embodiments of the present disclosure.

Figure 3:
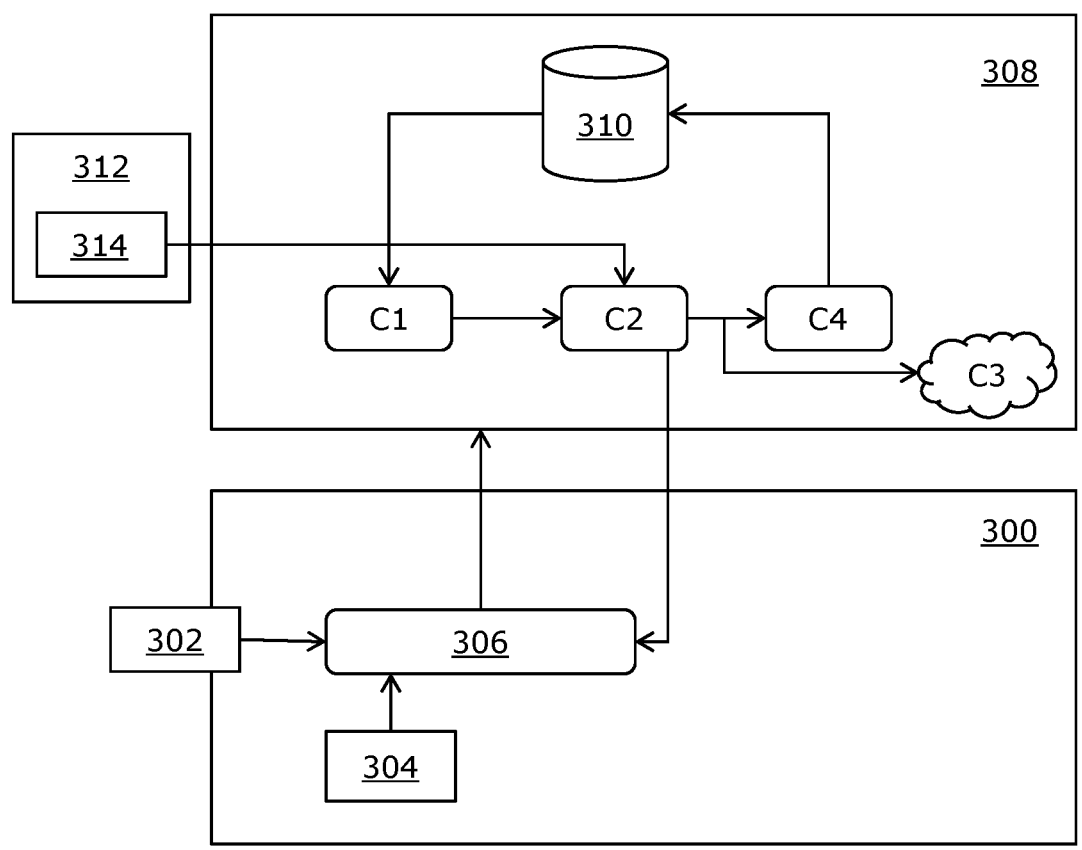
FIG. 3 illustrates an exemplary process flow for using cloud computing to improve accuracy of pose tracking, in accordance with an embodiment of the present disclosure.

Referring to FIG. 3, illustrated is an exemplary process flow for using cloud computing to improve accuracy of pose tracking, in accordance with an embodiment of the present disclosure. Firstly, at a client device 300, at least one first image (not shown) of a real-world environment is captured by a camera 302 of the client device 300 and a first measured pose of the client device 300 is measured by pose-tracking means 304 of the client device 300 whilst the at least one first image is being captured. Then, from a processor 306 of the client device 300, a server 308 receives the at least one first image along with information indicative of the first measured pose of the client device 300. Next, at C1, a three-dimensional (3D) environment model of the real-world environment is utilized by the server 308 to generate at least one first reconstructed image (namely, a synthetic image) from a perspective of the first measured pose of the client device 300, the 3D environment model being stored at a data repository 310. Next, at C2, a first spatial transformation that aligns a plurality of features extracted from the at least one first image with a plurality of features extracted from the at least one first reconstructed image is determined by the server 308. Thereafter, a first actual pose of the client device from which the at least one first image is captured, is calculated by the server 308, based on the first measured pose and the first spatial transformation. Next, information indicative of at least one of: the first actual pose of the client device 300, the first spatial transformation, is sent by the server 308 to the client device 300, for enabling the client device 300 to calculate its subsequent actual poses. Such information is provided as a corrected pose feedback to the processor 306 of the client device 300 via C2. It will be appreciated that the information indicative of the first actual pose of the client device 300 may be utilized for optional purposes/applications at C3. The first actual pose of the client device 300 may also be utilized at C4 to update the 3D environment model stored at the data repository 310. It will also be appreciated that optionally the server 308 receives, from a static device 312, a plurality of images of the real-world environment captured by a camera 314 of the static device 312. Such images are processed by the server 308 at C2, based on a fixed position of the camera 314, to generate the 3D environment model for storing it at the data repository 310.

FIG. 3 is merely an example, which should not unduly limit the scope of the claims herein. A person skilled in the art will recognize many variations, alternatives, and modifications of embodiments of the present disclosure.

Figure 4:
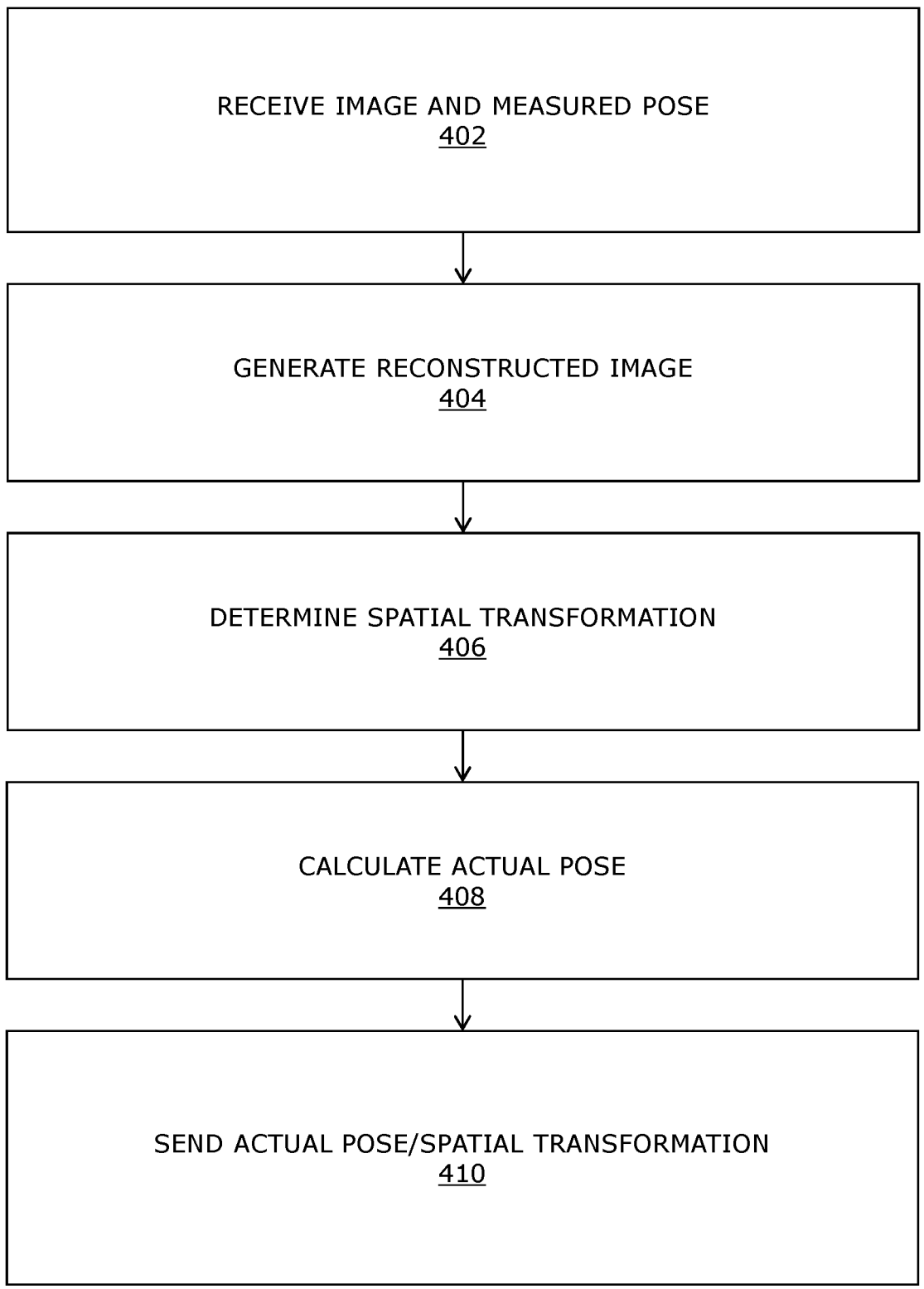
FIG. 4 illustrates steps of a method for improving accuracy of pose tracking, in accordance with an embodiment of the present disclosure.

Referring to FIG. 4, illustrated are steps of a method for using cloud computing to improve accuracy of pose tracking, in accordance with an embodiment of the present disclosure. At step 402, at least one first image of the real-world environment captured by at least one camera of a client device is received from the client device, along with information indicative of a first measured pose of the client device as measured by pose-tracking means of the client device while the at least one first image is being captured. At step 404, a three-dimensional environment model of the real-world environment is utilised for generating at least one first reconstructed image from a perspective of the first measured pose of the client device. At step 406, a first spatial transformation is determined, that aligns a plurality of features extracted from the at least one first image with a plurality of features extracted from the at least one first reconstructed image, wherein the first spatial transformation is indicative of a difference in the first measured pose of the client device and a first actual pose of the client device from which the at least one first image is captured. At step 408, the first actual pose of the client device is calculated, based on the first measured pose and the first spatial transformation. At step 410, information indicative of at least one of: the first actual pose of the client device, the first spatial transformation, is sent to the client device, for enabling the client device to calculate subsequent actual poses of the client device.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising a server and a data repository communicably coupled to the server, the data repository storing a three-dimensional environment model of a real-world environment, wherein the server is configured to:
  receive, from a client device, at least one first image of the real-world environment captured by at least one camera of the client device, along with information indicative of a first measured pose of the client device as measured by pose-tracking means of the client device while the at least one first image is being captured;
  utilise the three-dimensional environment model of the real-world environment to generate at least one first reconstructed image from a perspective of the first measured pose of the client device;
  determine a first spatial transformation that aligns a plurality of features extracted from the at least one first image with a plurality of features extracted from the at least one first reconstructed image, wherein the first spatial transformation is indicative of a difference in the first measured pose of the client device and a first actual pose of the client device from which the at least one first image is captured;

calculate the first actual pose of the client device, based on the first measured pose and the first spatial transformation; and send information indicative of at least one of: the first actual pose of the client device, the first spatial transformation, to the client device for enabling the client device to calculate subsequent actual poses of the client device.

2. The system of claim 1, further comprising the client device, wherein the client device is configured to:
receive, from the server, the information indicative of the first actual pose of the client device;
capture at least one second image of the real-world environment using the at least one camera, whilst measuring a second measured pose of the client device using the pose-tracking means;
determine a change in pose between the first measured pose and the second measured pose; and
calculate a second actual pose of the client device from which the at least one second image is captured, based on the first actual pose and the change in pose.

3. The system of claim 2, wherein when determining the change in pose, the client device is configured to:
determine a plurality of common features that are present in the at least one first image and the at least one second image; and
determine another spatial transformation that aligns the plurality of common features as extracted from the at least one first image with the plurality of common features as extracted from the at least one second image, wherein the another spatial transformation is indicative of the change in pose between the first measured pose and the second measured pose.

4. The system of claim 1, further comprising the client device, wherein the client device is configured to:
receive, from the server, the information indicative of the first spatial transformation;
capture at least one second image of the real-world environment using the at least one camera, whilst measuring a second measured pose of the client device using the pose-tracking means; and
calculate a second actual pose of the client device from which the at least one second image is captured, based on the second measured pose and the first spatial transformation.

5. A method comprising:
receiving, at a server from a client device, at least one first image of a real-world environment captured by at least one camera of the client device, along with information indicative of a first measured pose of the client device as measured by pose-tracking means of the client device while the at least one first image is being captured;
utilising a three-dimensional environment model of the real-world environment, at the server, for generating at least one first reconstructed image from a perspective of the first measured pose of the client device;
determining, at the server, a first spatial transformation that aligns a plurality of features extracted from the at least one first image with a plurality of features extracted from the at least one first reconstructed image, wherein the first spatial transformation is indicative of a difference in the first measured pose of the client device and a first actual pose of the client device from which the at least one first image is captured;
calculating, at the server, the first actual pose of the client device, based on the first measured pose and the first spatial transformation; and
sending information indicative of at least one of: the first actual pose of the client device, the first spatial transformation, from the server to the client device for enabling the client device to calculate subsequent actual poses of the client device.

6. The method of claim 5, further comprising:
receiving, at the client device from the server, the information indicative of the first actual pose of the client device;
capturing at least one second image of the real-world environment using the at least one camera, whilst measuring a second measured pose of the client device using the pose-tracking means;
determining, at the client device, a change in pose between the first measured pose and the second measured pose; and
calculating, at the client device, a second actual pose of the client device from which the at least one second image is captured, based on the first actual pose and the change in pose.

7. The method of claim 6, wherein the step of determining the change in pose comprises:
determining a plurality of common features that are present in the at least one first image and the at least one second image; and
determining another spatial transformation that aligns the plurality of common features as extracted from the at least one first image with the plurality of common features as extracted from the at least one second image, wherein another spatial transformation is indicative of the change in pose between the first measured pose and the second measured pose.

8. The method of claim 5, further comprising:
receiving, at the client device from the server, the information indicative of the first spatial transformation;
capturing at least one second image of the real-world environment using the at least one camera, whilst measuring a second measured pose of the client device using the pose-tracking means; and
calculating, at the client device, a second actual pose of the client device from which the at least one second image is captured, based on the second measured pose and the first spatial transformation.

* * * * *